United States Patent
Miles et al.

(10) Patent No.: US 9,400,944 B2
(45) Date of Patent: Jul. 26, 2016

(54) SPACE DILATING TWO-WAY VARIABLE SELECTION

(71) Applicant: SAS Institute Inc., Cary, NC (US)

(72) Inventors: Brian Oneal Miles, Cary, NC (US); Dan Kelly, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 550 days.

(21) Appl. No.: 13/935,087

(22) Filed: Jul. 3, 2013

(65) Prior Publication Data

US 2014/0258352 A1 Sep. 11, 2014

Related U.S. Application Data

(60) Provisional application No. 61/776,042, filed on Mar. 11, 2013, provisional application No. 61/783,276, filed on Mar. 14, 2013.

(51) Int. Cl.
*G06K 9/62* (2006.01)
*G06F 17/18* (2006.01)
*G06F 17/30* (2006.01)

(52) U.S. Cl.
CPC .............. *G06K 9/6247* (2013.01); *G06F 17/18* (2013.01); *G06F 17/30598* (2013.01); *G06F 17/30705* (2013.01)

(58) Field of Classification Search
None
See application file for complete search history.

(56) References Cited

U.S. PATENT DOCUMENTS

| | | | |
|---|---|---|---|
| 6,349,309 B1* | 2/2002 | Aggarwal | G06F 17/30598 |
| 7,853,431 B2* | 12/2010 | Samardzija | 702/179 |
| 2005/0060103 A1* | 3/2005 | Chamness | H01L 21/67253 702/30 |
| 2011/0297369 A1* | 12/2011 | Kumaran | G01V 1/288 166/250.01 |
| 2014/0039834 A1* | 2/2014 | Shibuya | G06F 11/22 702/183 |
| 2015/0007173 A1* | 1/2015 | Ionescu | G06F 9/45533 718/1 |

OTHER PUBLICATIONS

T.A. Runkler and F. Steinke, "A New Approach to Clustering Using Eigen Decomposition", 2010 IEEE International Conference on Fuzzy Systems, 2010.*

* cited by examiner

*Primary Examiner* — Matthew Sandifer
(74) *Attorney, Agent, or Firm* — Bell & Manning, LLC

(57) ABSTRACT

A method of identifying a set of parameters representative of a data set is provided. An eigen decomposition of a covariance matrix is calculated to form a decomposed matrix and an eigenvalue vector. The covariance matrix is calculated for a matrix of data including a plurality of data values for each of a plurality of parameters. The decomposed matrix includes a number of eigenvectors equal to a number of the plurality of parameters with each eigenvector including a coefficient for each parameter. The eigenvalue vector includes an eigenvalue defined for each eigenvector. A first matrix is created by rank ordering the coefficient within each parameter of the plurality of parameters for each of the plurality of parameters. A score is determined for each parameter using the created first matrix and the eigenvalue vector. A parameter set is identified based on the determined score for each parameter.

30 Claims, 5 Drawing Sheets

US 9,400,944 B2

SPACE DILATING TWO-WAY VARIABLE SELECTION

CROSS-REFERENCE TO RELATED APPLICATIONS

The present application claims priority under 35 U.S.C. 119(e) to U.S. Provisional Patent Application No. 61/776,042 filed Mar. 11, 2013, and to U.S. Provisional Patent Application No. 61/783,276 filed Mar. 14, 2013, the entire contents of which are hereby incorporated by reference.

BACKGROUND

A dataset of observations may be captured in a matrix as a function of possibly correlated parameters. Each parameter represents a definable characteristic of a subject captured in the dataset. In some cases, the dataset can be segmented into a smaller set of parameters while maintaining as much of the variance in the dataset as possible. In cluster analysis, the ability to maximize a distance between distinct clusters of the dataset, also known as space dilation, is important to yield useful results from the segmented dataset. Identification and selection of an appropriate set of parameters representative of the dataset is important to increase the space dilation. For example, to segment customers based on p attributes using cluster analysis, there is separation between the clusters or like groupings of customers based on the p attributes. Increasing the distance between the clusters defines clusters more distinctly, which results in improved associations/disassociations between the customers (subjects). Selecting too many variables can decrease the space dilation because extreme values blend with less extreme values per observation.

SUMMARY

In an example embodiment, a method of identifying a set of parameters representative of a data set is provided. An eigen decomposition of a covariance matrix is calculated to form a decomposed matrix and an eigenvalue vector. The covariance matrix is calculated for a matrix of data including a plurality of data values for each of a plurality of parameters. The decomposed matrix includes a number of eigenvectors equal to a number of the plurality of parameters with each eigenvector of the eigenvectors including a coefficient for each parameter of the plurality of parameters. The eigenvalue vector includes an eigenvalue defined for each eigenvector of the eigenvectors. A first matrix is created by rank ordering the coefficient within each parameter of the plurality of parameters for each of the plurality of parameters. A score is determined for each parameter of the plurality of parameters using the created first matrix and the eigenvalue vector. A parameter set including a predefined number of parameters of the plurality of parameters is identified based on the determined score for each parameter of the plurality of parameters.

In another example embodiment, a computer-readable medium is provided having stored thereon computer-readable instructions that when executed by a computing device, cause the computing device to perform the method of identifying a set of parameters representative of a data set.

In yet another example embodiment, a system is provided. The system includes, but is not limited to, a processor and a computer-readable medium operably coupled to the processor. The computer-readable medium has instructions stored thereon that, when executed by the processor, cause the system to perform the method of identifying a set of parameters representative of a data set.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

One approach to variable selection for space dilation is to use principal component analysis (PCA). PCA is a mathematical procedure that uses an orthogonal transformation to convert the dataset of observations into a set of values of linearly uncorrelated parameters or variables called principal components. PCA seeks to describe the variance-covariance structure of the dataset of p parameters by using linear combinations of the data to describe variability within a smaller set of parameters or variables. PCA calculates eigenvalues and eigenvectors to produce linear coefficients and the variance associated with each. Traditionally, the first step using PCA is to subset the p parameters based on the eigenvalues regardless of the eigenvector coefficients. The second step uses manual input from researchers to subsequently evaluate the values in each eigenvector itself. As the number of parameters grows, however, this approach may become increasingly time consuming and cumbersome to use.

Figure 1:
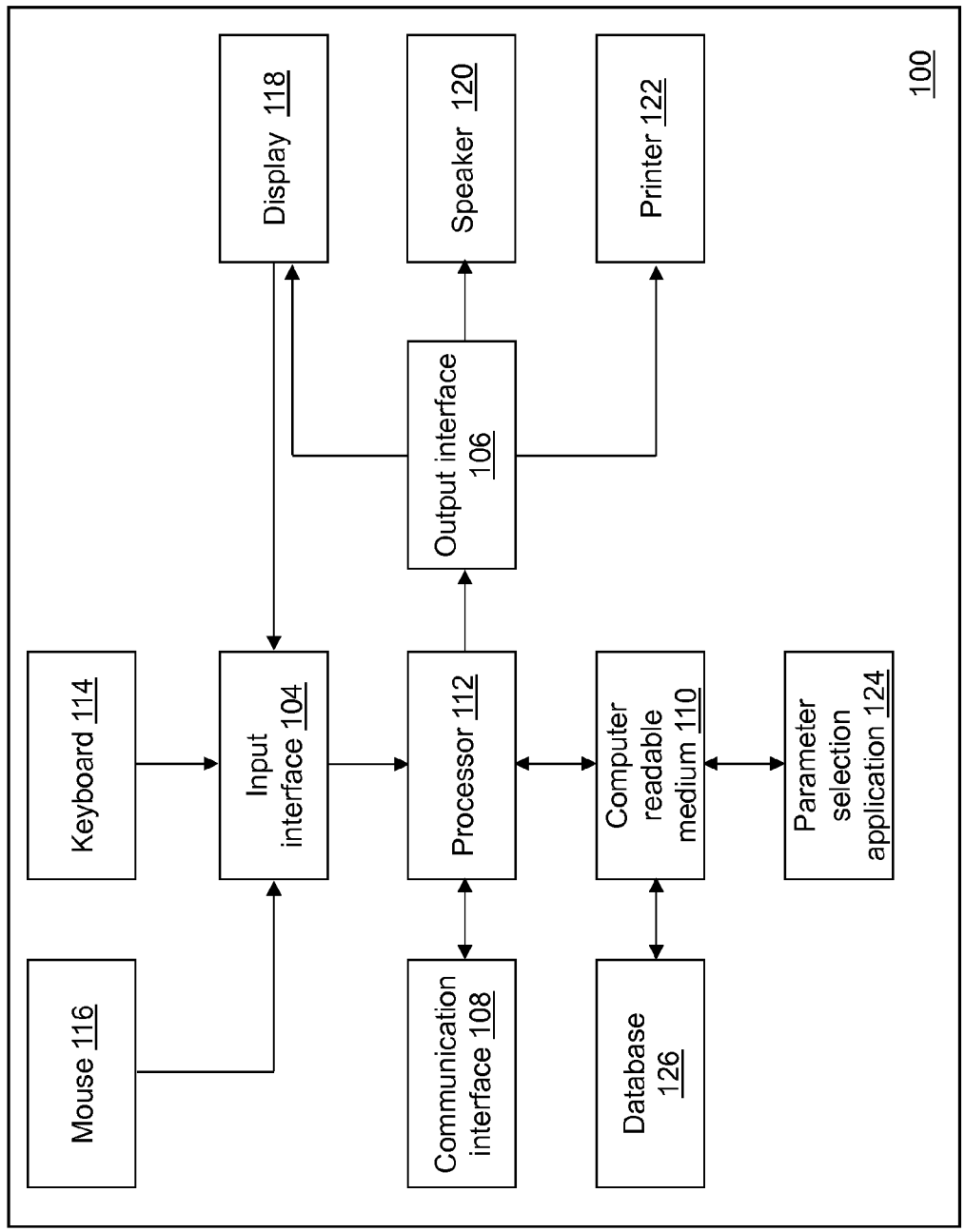
FIG. 1 depicts a block diagram of a parameter selection system in accordance with an illustrative embodiment.

Referring to FIG. 1, a block diagram of a parameter selection system 100 is shown in accordance with an illustrative embodiment. Parameter selection system 100 can include one or more computing devices of any form factor such as a laptop, a desktop, a smart phone, a personal digital assistant, an integrated messaging device, a tablet computer, etc. Parameter selection system 100 may include an input interface 104, an output interface 106, a communication interface 108, a computer-readable medium 110, a processor 112, a keyboard 114, a mouse 116, a display 118, a speaker 120, a printer 122, a parameter selection application 124, and a database 126. Fewer, different, and additional components may be incorporated into parameter selection system 100.

Input interface 104 provides an interface for receiving information from the user for entry into parameter selection system 100 as understood by those skilled in the art. Input interface 104 may interface with various input technologies including, but not limited to, keyboard 114, mouse 116, display 118, a track ball, a keypad, one or more buttons, etc. to allow the user to enter information into parameter selection system 100 or to make selections presented in a user interface displayed on display 118. Display 118 may be a thin film transistor display, a light emitting diode display, a liquid crystal display, or any of a variety of different displays understood by those skilled in the art. Keyboard 114 may be any of a variety of keyboards as understood by those skilled in the art. Mouse 116 may be any of a variety of mouse devices as understood by those skilled in the art. The same interface may support both input interface 104 and output interface 106. For example, a display comprising a touch screen both allows user input and presents output to the user. Parameter selection system 100 may have one or more input interfaces that use the same or a different input interface technology. Keyboard 114, mouse 116, display 118, etc. further may be accessible by parameter selection system 100 through communication interface 108.

Output interface 106 provides an interface for outputting information for review by a user of parameter selection system 100 or for use by a subsequent data processing application or data presentation application. For example, output interface 106 may interface with various output technologies including, but not limited to, display 118, speaker 120, printer 122, etc. Speaker 120 may be any of a variety of speakers as understood by those skilled in the art. Printer 122 may be any of a variety of printers as understood by those skilled in the art. Parameter selection system 100 may have one or more output interfaces that use the same or a different interface technology. Display 118, speaker 120, printer 122, etc. further may be accessible by parameter selection system 100 through communication interface 108.

Communication interface 108 provides an interface for receiving and transmitting data between devices using various protocols, transmission technologies, and media as understood by those skilled in the art. Communication interface 108 may support communication using various transmission media that may be wired and/or wireless. Parameter selection system 100 may have one or more communication interfaces that use the same or a different communication interface technology. Data and messages may be transferred between parameter selection system 100 and one or more other computing devices using communication interface 108.

Computer-readable medium 110 is an electronic holding place or storage for information so the information can be accessed by processor 112 as understood by those skilled in the art. Computer-readable medium 110 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Parameter selection system 100 may have one or more computer-readable media that use the same or a different memory media technology. Parameter selection system 100 also may have one or more drives that support the loading of a memory media such as a CD or DVD.

Processor 112 executes instructions as understood by those skilled in the art. The instructions may be carried out by a special purpose computer, logic circuits, or hardware circuits. Processor 112 may be implemented in hardware, firmware, or any combination of these methods and/or in combination with software. The term "execution" is the process of running an application or the carrying out of the operation called for by an instruction. The instructions may be written using one or more programming language, scripting language, assembly language, etc. Processor 112 executes an instruction, meaning it performs/controls the operations called for by that instruction. Processor 112 operably couples with input interface 104, with output interface 106, with communication interface 108, and with computer-readable medium 110 to receive, to send, and to process information. Processor 112 may retrieve a set of instructions from a permanent memory device and copy the instructions in an executable form to a temporary memory device that is generally some form of RAM. Parameter selection system 100 may include a plurality of processors that use the same or a different processing technology.

Parameter selection application 124 performs operations associated with identifying a set of one or more parameters representative of a dataset. Some or all of the operations described herein may be embodied in parameter selection application 124. The operations may be implemented using hardware, firmware, software, or any combination of these methods. Referring to the example embodiment of FIG. 1, parameter selection application 124 is implemented in software (comprised of computer-readable and/or computer-executable instructions) stored in computer-readable medium 110 and accessible by processor 112 for execution of the instructions that embody the operations of image creation and processing application 124. Parameter selection application 124 may be written using one or more programming languages, assembly languages, scripting languages, etc.

Parameter selection application 124 may be implemented as a Web application. For example, parameter selection application 124 may be configured to receive hypertext transport protocol (HTTP) responses from other computing devices and to send HTTP requests to other computing devices. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol. The file accessed may be a simple text file, an image file, an audio file, a video file, an executable, a common gateway interface application, a Java applet, an extensible markup language (XML) file, or any other type of file supported by HTTP.

Parameter selection system 100 may include database 126 stored on computer-readable medium 110 or can access database 126 either through a direct connection or through a network using communication interface 108. Database 126 is a data repository for parameter selection system 100. For example, the dataset processed using parameter selection application 124 may be stored in database 126. Merely for illustration, the dataset may include data for banking customers including balances, transaction counts, credit scores, etc. An example dataset may include 46 candidate parameters for a cluster analysis and >32,000 observations. Another example dataset may include data related to gift/donor information with promotion and customer demographic information resulting in 23 candidate parameters and >96,000 observations. Database 126 may include a plurality of databases that may be organized into multiple database tiers to improve data management and access. Database 126 may utilize various database technologies and a variety of formats as known to those skilled in the art including a file system, a relational database, a system of tables, a structured query language database, etc. Database 126 may be implemented as a single database or as multiple databases stored in different storage locations distributed over a network and using the same or different formats.

Figure 2:
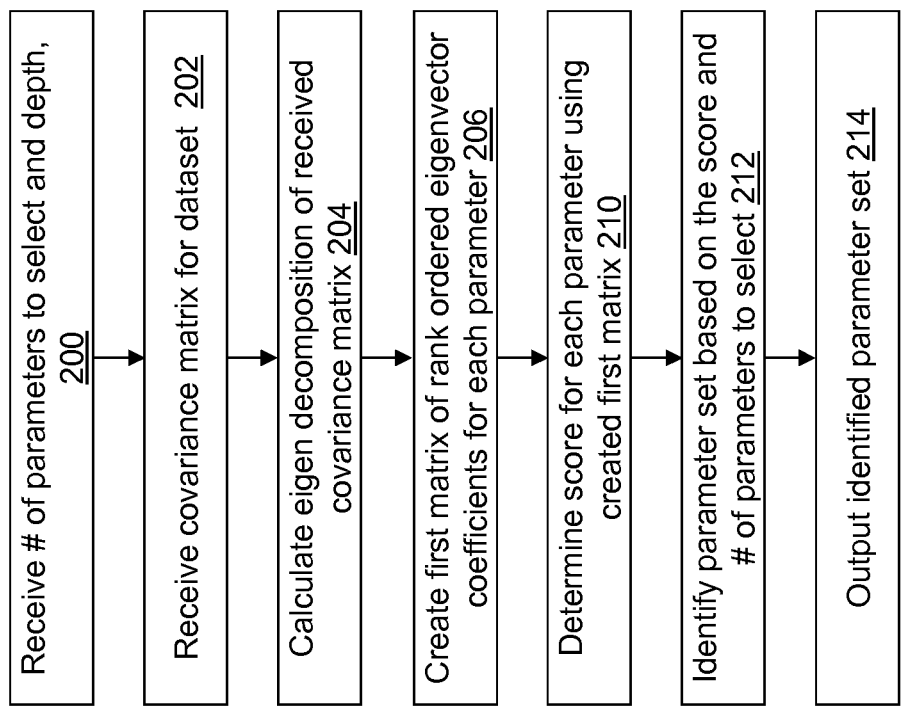
FIG. 2 depicts a flow diagram illustrating example operations performed by the parameter selection system of FIG. 1 in accordance with an illustrative embodiment.

Referring to FIG. 2, example operations associated with parameter selection application 124 are described. Additional, fewer, or different operations may be performed depending on the embodiment. The order of presentation of the operations of FIG. 2 is not intended to be limiting. A user can interact with one or more user interface windows presented to the user in display 118 under control of parameter selection application 124 independently or through a browser application in an order selectable by the user. As further understood by a person of skill in the art, various operations may be performed in parallel. Although some of the operational flows are presented in sequence, the various operations may be performed in various repetitions, concurrently, and/or in other orders than those that are illustrated.

For example, a user may execute parameter selection application 124, which causes presentation of a first user interface window, which may include a plurality of menus and selectors such as drop down menus, buttons, text boxes, hyperlinks, etc. associated with parameter selection application 124 as understood by a person of skill in the art. Parameter selection application 124 controls the presentation of one or more additional user interface windows that further may include menus and selectors such as drop down menus, buttons, text boxes, hyperlinks, additional windows, etc. based on user selections received by parameter selection application 124. Thus, as understood by a person of skill in the art, the user interface windows are presented on display 118 under control of the computer-readable and/or computer-executable instructions of parameter selection application 124 executed by processor 112 of parameter selection system 100. As the user interacts with the user interface windows presented under control of parameter selection application 124, different user interface windows may be presented to provide the user with various controls from which the user may make selections or enter values associated with various application controls. In response, as understood by a person of skill in the art, parameter selection application 124 receives an indicator associated with an interaction by the user with a user interface window. Based on the received indicator, parameter selection application 124 performs one or more additional operations.

In an operation 200, one or more application control values are received. As an example, the one or more application control values may be entered or selected by a user and received by parameter selection application 124. In an illustrative embodiment, a selection of a number of parameters to select, N, and a depth value, D, may be received after interaction by the user with a user interface window. For example, a numerical value is received that indicates a user selection of the value to be used for N and D. The value may be entered by the user using mouse 116, keyboard 114, display 118, etc. In an illustrative embodiment, instead of receiving user selections through the presented user interface window, default values for N and/or D may be stored in computer-readable medium 110 and received by retrieving the one or more values from the appropriate memory location as understood by a person of skill in the art.

In an operation 202, a covariance matrix is received for the dataset to be processed. In an illustrative embodiment, the covariance matrix is a correlation matrix. A correlation matrix is a covariance matrix whose variables have been centered and scaled. The covariance matrix may be calculated by parameter selection application 124 for a dataset selected by the user under control of parameter selection application 124. The dataset is a matrix of data that includes a plurality of data values for each of a plurality of parameters. Each parameter represents a definable characteristic of a subject captured in the dataset. The covariance matrix may be selected by the user under control of parameter selection application 124 after having been calculated previously by parameter selection application 124 and saved to computer-readable medium 108/database 126 or after having been calculated previously by another application as a pre-processing step, as understood by a person of skill in the art. The dataset and/or covariance matrix may be selected by the user using one or more of the user interface windows and received by retrieving the dataset and/or covariance matrix from computer-readable medium 108/database 126.

Of course, operation 202 may be performed before operation 200. In an illustrative embodiment, a number of the plurality of parameters, p, is determined based on a number of columns in the matrix of data. In another illustrative embodiment, p may be defined by the user and received by parameter selection application 124 as an input as discussed previously in association with N and D. For example, the dataset may include parameters that the user does not want to include in the parameter selection process. The covariance matrix may be calculated for only those values the user wants to include and p is less than the number of columns in the dataset. In an illustrative embodiment, $1 \leq N \leq p$ and $1 \leq D \leq p$.

In an operation 204, an eigen decomposition of the received covariance matrix is calculated as understood by a person of skill in the art. Calculating the eigen decomposition forms a decomposed matrix and an eigenvalue vector. The decomposed matrix includes a number of eigenvectors equal to the number of the plurality of parameters with each eigenvector of the eigenvectors including a coefficient for each parameter of the plurality of parameters. The eigenvalue vector includes an eigenvalue defined for each eigenvector of the eigenvectors. The value selected for D allows the user to control how many orthogonal dimensions can contribute to a candidate parameter's score. Typically, as N increases the space dilation (generalized variance) decreases. Additionally, setting the value for D too high may result in diminished separation between selected parameters. As a general rule of thumb, setting $D \geq N$ may be a good default value.

For illustration, a decomposed matrix of a dataset of four variables is shown below:

| Parameter | Eigenvector 1 | Eigenvector 2 | Eigenvector 3 | Eigenvector 4 |
| --- | --- | --- | --- | --- |
| Number cash back | −0.22306 | 0.93841 | 0.25630 | −0.06281 |
| Checking account | −0.61277 | −0.18563 | 0.31775 | 0.69935 |
| Money market | 0.61302 | 0.25653 | −0.23162 | 0.71046 |
| Credit card | 0.44605 | −0.13830 | 0.88301 | −0.04707 |

For illustration, an eigenvalue vector of the dataset of four variables is shown below:

| Eigenvector | Eigenvalue | Eigenvalue/p |
| --- | --- | --- |
| 1 | 1.3850945 | 0.3463 |
| 2 | 0.9867202 | 0.2467 |
| 3 | 0.9028410 | 0.2257 |
| 4 | 0.7253442 | 0.1813 |

In an operation 206, a first matrix is created. The first matrix includes rank ordered eigenvector coefficients for each parameter of the plurality of parameters. In an illustrative embodiment, the rank ordering is performed using the absolute value of the eigenvector coefficients. In an illustrative embodiment, each column of the first matrix includes the rank ordered absolute value in descending order (highest to lowest) of the coefficients associated with each parameter of the plurality of parameters. As a result, the first matrix is a p×p matrix.

For illustration, the first matrix created based on the decomposed matrix of the dataset of four variables above is shown below:

| Parameter | | | | |
|---|---|---|---|---|
| Number cash back | 0.93841 | 0.25630 | 0.22306 | 0.06281 |
| Checking account | 0.69935 | 0.61277 | 0.31775 | 0.18563 |
| Money market | 0.71046 | 0.61302 | 0.25653 | 0.23162 |
| Credit card | 0.88301 | 0.44605 | 0.13830 | 0.04707 |

In an operation 210, a score is determined for each parameter of the plurality of parameters using the created first matrix. In an illustrative embodiment, the score is determined for each parameter as $$S_i = \sum_{j=1}^{D} R_{ji} * \frac{\lambda}{p},$$

where $S_i$ is the score for the $i^{th}$ parameter, $R_{ji}$ is the created first matrix, and $\lambda$ is the eigenvalue associated the eigenvalue vector from which the coefficient $R_{ji}$ was selected for the $i^{th}$ parameter.

For illustration, the score for each parameter of the dataset of four variables is shown below using a D value of 2:

| Parameter | Calculation | Score |
|---|---|---|
| Number cash back | 0.93841 * 0.2467 + 0.25630 * 0.2257 | 0.289 |
| Checking account | 0.69935 * 0.1813 + 0.61277 * 0.3463 | 0.339 |
| Money market | 0.71046 * 0.1813 + 0.61302 * 0.3463 | 0.341 |
| Credit card | 0.88301 * 0.2257 + 0.44605 * 0.3463 | 0.354 |

In an operation 212, a parameter set is identified based on the score and N. For example, the parameter set may be identified by selecting the N parameters of the plurality of parameters that have the highest score. Using an N value of 2 and a D value of 2, the identified parameter set includes {Credit card, Money market}.

In an operation 214, an identified parameter set is output, for example, by using display 118 or printer 122 or by storing the identified parameter set to computer-readable medium 108/database 126. In an illustrative embodiment, the output parameter set may be used to perform cluster analysis on the dataset.

Figure 3:
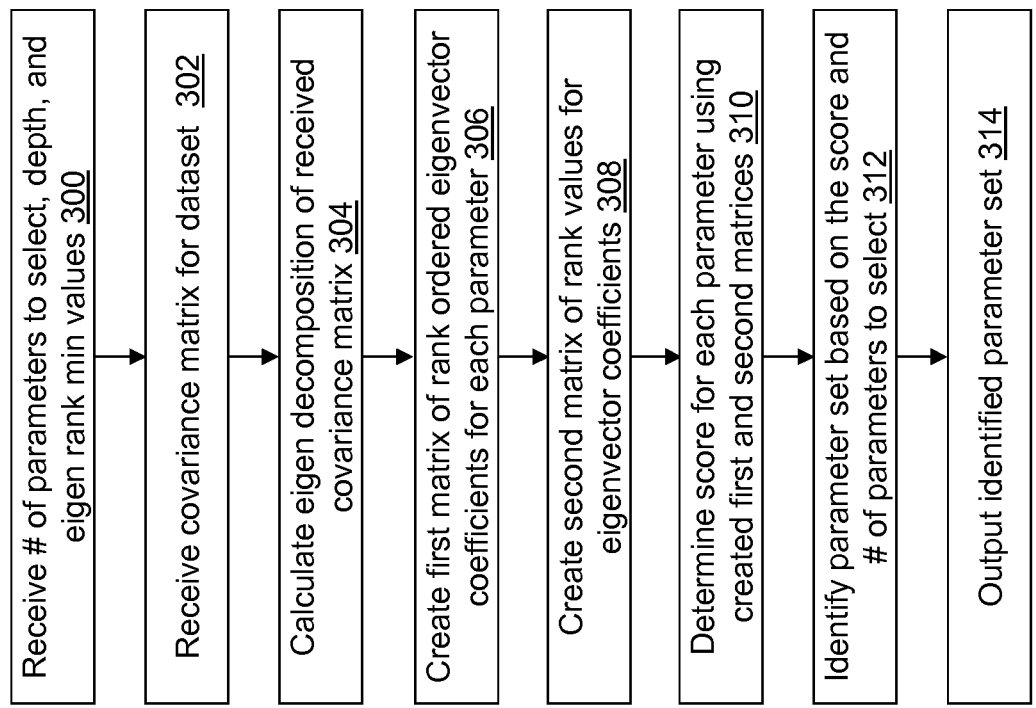
FIG. 3 depicts a flow diagram illustrating example operations performed by the parameter selection system of FIG. 1 in accordance with a second illustrative embodiment.

Referring to FIG. 3, example operations associated with parameter selection application 124 are described in accordance with another illustrative embodiment. Additional, fewer, or different operations may be performed depending on the embodiment. The order of presentation of the operations of FIG. 3 is not intended to be limiting. A user can interact with one or more user interface windows presented to the user in display 118 under control of parameter selection application 124 as explained previously referring to FIG. 2.

In an operation 300, one or more application control values are received. As an example, the one or more application control values may be entered or selected by a user and received by parameter selection application 124. In an illustrative embodiment, N, D, and an eigen rank min value, $ER_{min}$, may be received after interaction by the user with a user interface window. $ER_{min}$ allows the user to specify how many coefficients in each eigenvector can contribute to a candidate parameter's score. For example, a numerical value is received that indicates a user selection of the value to be used for N, D, and $ER_{min}$. The value may be entered by the user using mouse 116, keyboard 114, display 118, etc. In an illustrative embodiment, instead of receiving user selections through the presented user interface window, default values for N, D, and/or $ER_{min}$ may be stored in computer-readable medium 110 and received by retrieving the one or more values from the appropriate memory location as understood by a person of skill in the art. When parameters are suspected to be highly correlated, setting $ER_{min}$ to a lower value tends to yield better results. As a general rule of thumb, setting $ER_{min}$ based on $N/2 \leq ER_{min} \leq N$ may be a good default value.

Similar to operation 202, in an operation 302, the covariance matrix is received for the dataset to be processed. Similar to operation 204, in an operation 304, the eigen decomposition of the received covariance matrix is calculated as understood by a person of skill in the art.

Similar to operation 206, in an operation 306, the first matrix is created. In an operation 308, a second matrix is created by rank ordering the coefficients of each eigenvector in descending order (highest to lowest) within each eigenvector in each matrix position of the decomposed matrix. For illustration, the second matrix created based on the decomposed matrix of the dataset of four variables is shown below:

| Parameter | Eigenvector 1 | Eigenvector 2 | Eigenvector 3 | Eigenvector 4 |
|---|---|---|---|---|
| Number cash back | 4 | 1 | 3 | 3 |
| Checking account | 2 | 3 | 2 | 2 |
| Money market | 1 | 2 | 4 | 1 |
| Credit card | 3 | 4 | 1 | 4 |

In an operation 310, a score is determined for each parameter of the plurality of parameters using the created first and second matrices. In an illustrative embodiment, the score is determined for each parameter as $S_i = \sum_{j=1}^{D} [\text{IF } ER_{ji} \leq ER\text{min } R_{ji} * \lambda, p]$, where ERji is the created second matrix, Si is the score for the $i^{th}$ parameter, $R_{ji}$ is the created first matrix, and $\lambda$ is the eigenvalue associated with the coefficient selected from the eigenvalue vector for the $i^{th}$ parameter.

For illustration, the score for each parameter of the dataset of four variables is shown below using a D value of 2 and an $ER_{min}$ value of 1:

| Parameter | Calculation | Score |
|---|---|---|
| Number cash back | 0.93841 * 0.2467 | 0.231 |
| Checking account | 0.0 | 0.0 |
| Money market | 0.61302 * 0.3463 + 0.71046 * 0.1813 | 0.341 |
| Credit card | 0.88301 * 0.2257 | 0.199 |

For illustration, the score for each parameter of the dataset of four variables is shown below using a D value of 2 and an $ER_{min}$ value of 2:

| Parameter | Calculation | Score |
|---|---|---|
| Number cash back | 0.93841 * 0.2467 | 0.231 |
| Checking account | 0.69935 * 0.1813 + 0.61277 * 0.3463 | 0.339 |
| Money market | 0.61302 * 0.3463 + 0.71046 * 0.1813 | 0.341 |
| Credit card | 0.88301 * 0.2257 | 0.199 |

Similar to operation 212, in an operation 312, the parameter set is identified based on the score and N. Using an N value of 2, a D value of 2, and an $ER_{min}$ value of 1, the identified parameter set includes {Money market, Number cash back}. Using an N value of 2, a D value of 2, and an $ER_{min}$ value of 2, the identified parameter set includes {Money market, Checking account}.

Similar to operation 214, in an operation 314, the identified parameter set is output.

Figure 4:
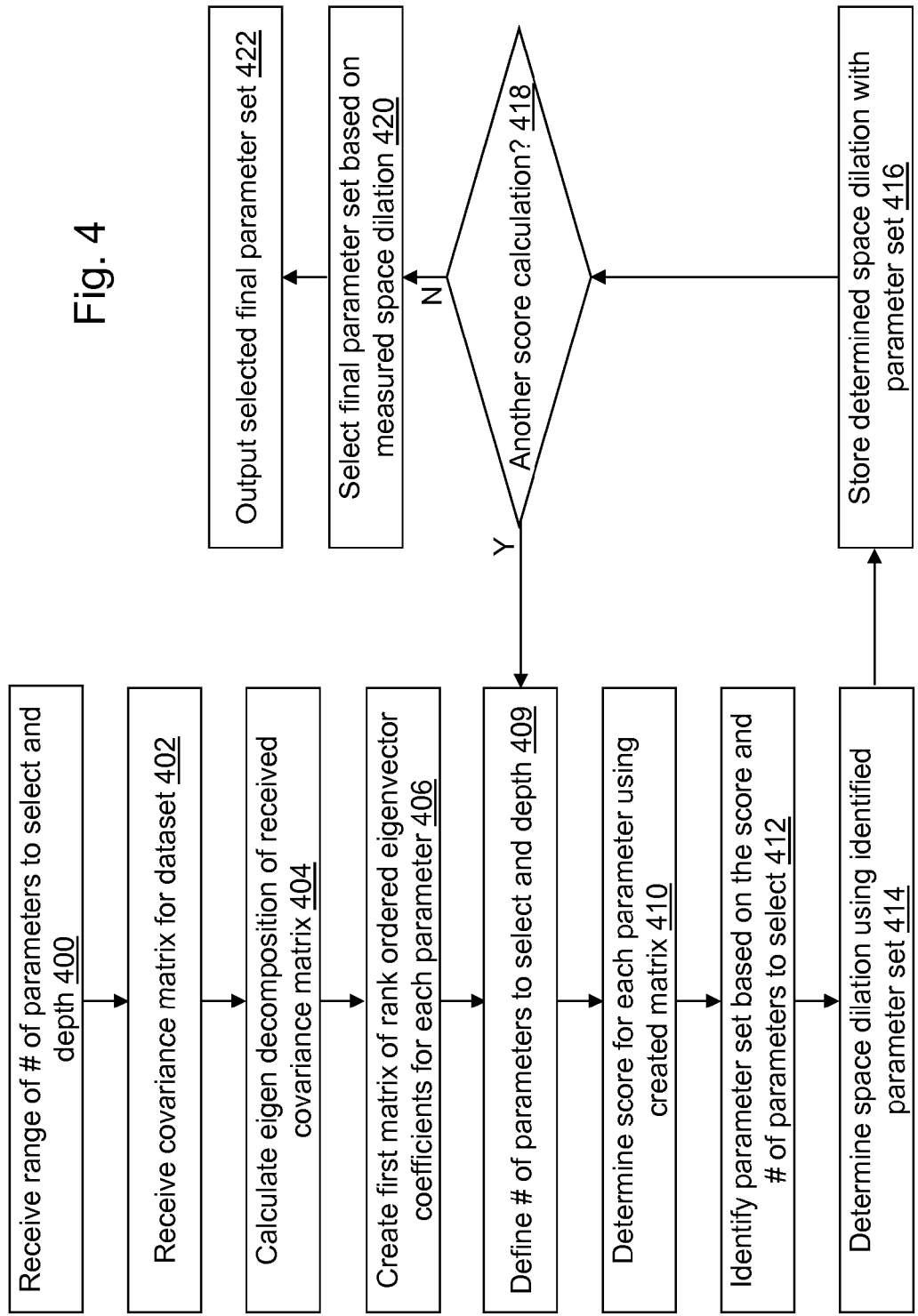
FIG. 4 depicts a flow diagram illustrating example operations performed by the parameter selection system of FIG. 1 in accordance with a third illustrative embodiment.

Referring to FIG. 4, example operations associated with parameter selection application 124 are described. Additional, fewer, or different operations may be performed depending on the embodiment. The order of presentation of the operations of FIG. 4 is not intended to be limiting. A user can interact with one or more user interface windows presented to the user in display 118 under control of parameter selection application 124 as explained previously referring to FIG. 2.

In an operation 400, a range of one or more application control values is received. As an example, the one or more application control values may be entered or selected by a user and received by parameter selection application 124. In an illustrative embodiment, a selection of a range of values for N and a selection of a range of values for D may be received after interaction by the user with the presented user interface window. As discussed previously, the range of values for N and/or the range of values for D may have default values associated with them that are stored in computer-readable medium 110 and received by retrieving the one or more values from the appropriate memory location as understood by a person of skill in the art. The range of values may be defined using a minimum value and a maximum value. The default incremental value may be one or may be specified by the user. Thus, values for $N_{min}$, $N_{max}$, $N_{inc}$, $D_{min}$, $D_{max}$, and/or $D_{inc}$ may be received. Of course, $N_{min}$ may be equal to $N_{max}$, and/or $D_{min}$ may be equal to $D_{max}$.

Similar to operation 202, in an operation 402, the covariance matrix is received for the dataset to be processed. Similar to operation 204, in an operation 404, the eigen decomposition of the received covariance matrix is calculated as understood by a person of skill in the art. Similar to operation 206, in an operation 406, the first matrix is created.

In operation 409, N and D are defined. For example, N may be initialized to $N_{min}$, and D may be initialized to $D_{min}$. Of course, N may be initialized to $N_{max}$, and/or D may be initialized to $D_{max}$. On successive iterations of operation 409, N and D are redefined by incrementing up or down using $N_{inc}$ and $D_{inc}$ depending on the initial value as understood by a person of skill in the art.

Similar to operation 210, in an operation 410, a score is determined for each parameter of the plurality of parameters using the created first matrix and the current value of D. Similar to operation 212, in an operation 412, the parameter set is identified based on the score and the current value of N.

In an operation 414, a value of the space dilation is determined using the identified parameter set. In an illustrative embodiment, the value of the space dilation may be determined using a D-optimality output metric as understood by a person of skill in the art. D-optimal designs maximize the D-efficiency, which is a volume criterion on the generalized variance of the parameter estimates. Generally, a D-optimal design seeks to maximize the determinant of the information matrix. The D-optimality output metric represents the proportion of the optimal generalized variance explained by the identified parameter set relative to an optimal selection. Other methods may be used to determine a metric representing a measure of the space dilation that results when the identified parameter set is used.

In an operation 416, the value of the determined space dilation is stored in association with the identified parameter set as understood by a person of skill in the art. For illustration, an indicator of the identified parameter set may be stored in a table with the iteration values for N and D and with the D-optimality metric for each repetition of operation 416.

In an operation 418, a determination is made concerning whether or not another score is to be calculated. If another score is to be calculated, processing continues in operation 409 to update the value of N or D using $N_{inc}$ and $D_{inc}$. Operations 410 to 416 are repeated for each incremental value of N between $N_{min}$ and $N_{max}$, and for each incremental value of D between $D_{min}$ and $D_{max}$. If each value of N and each value of D has been processed such that no additional score calculation is needed, processing continues in an operation 420.

In operation 420, a final parameter set is selected based on the stored values of the measured space dilation. For example, the final parameter set may be selected by identifying the parameter set associated with the highest (or lowest depending on the test selected) value of the measured space dilation. Similar to operation 214, in an operation 422, the selected final parameter set is output.

Figure 5:
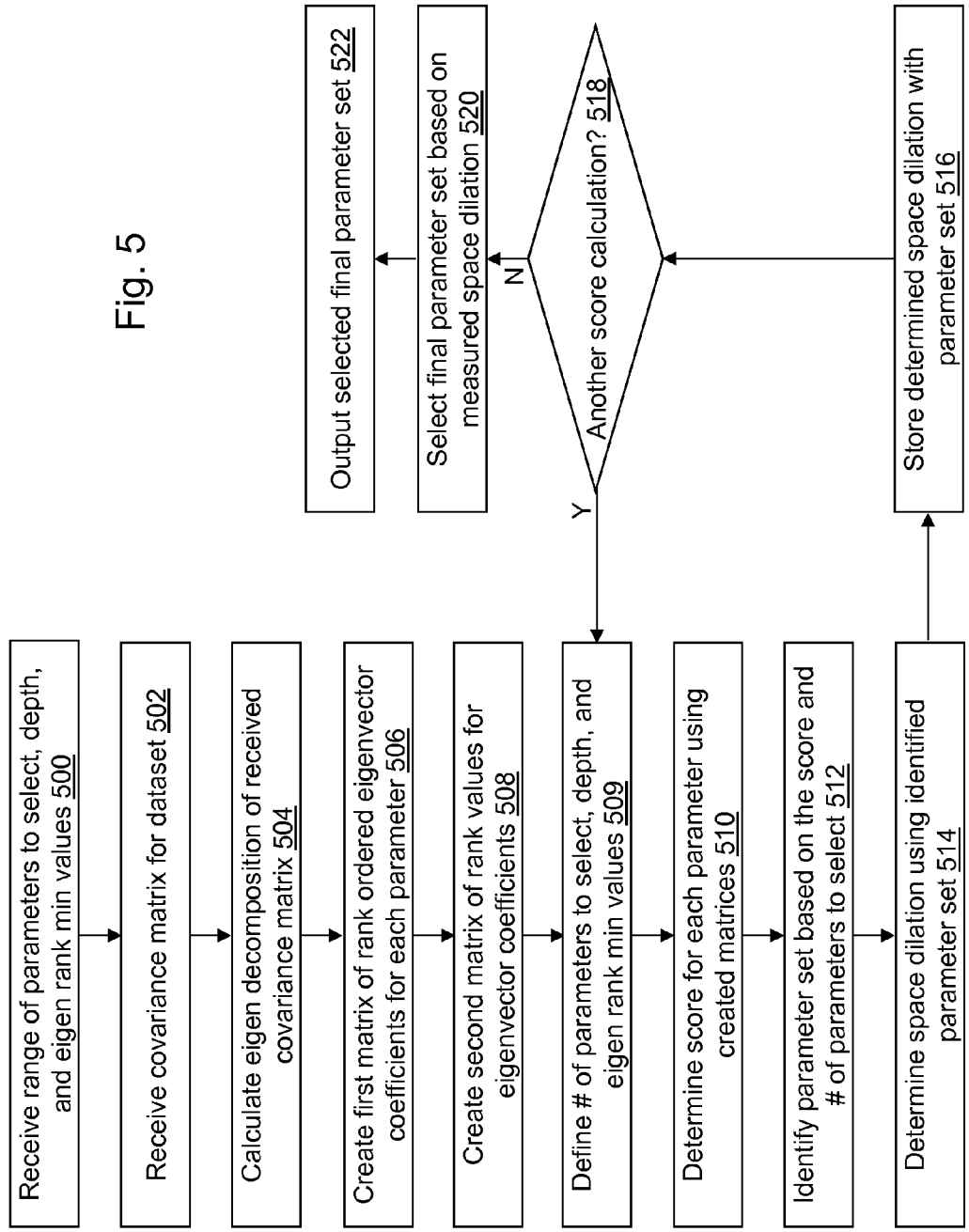
FIG. 5 depicts a flow diagram illustrating example operations performed by the parameter selection system of FIG. 1 in accordance with a fourth illustrative embodiment.

Referring to FIG. 5, example operations associated with parameter selection application 124 are described. Additional, fewer, or different operations may be performed depending on the embodiment. The order of presentation of the operations of FIG. 5 is not intended to be limiting. A user can interact with one or more user interface windows presented to the user in display 118 under control of parameter selection application 124 as explained previously referring to FIG. 2.

In an operation 500, a range of one or more application control values is received. As an example, the one or more application control values may be entered or selected by a user and received by parameter selection application 124. In an illustrative embodiment, a selection of a range of values for N, a selection of a range of values for D, and a selection of a range of values for $ER_{min}$ may be received after interaction by the user with the presented user interface window. As discussed previously, the range of values for N, the range of values for D, and/or the range of values for $ER_{min}$ may have default values associated with them that are stored in computer-readable medium 110 and received by retrieving the one or more values from the appropriate memory location as understood by a person of skill in the art. The range of values may be defined using a minimum value and a maximum value. The default incremental value may be one or may be specified by the user. Thus, values for $N_{min}$, $N_{max}$, $N_{inc}$, $D_{min}$, $D_{max}$, $D_{inc}$, $ER_n$, $ER_x$, and $ER_{inc}$ may be received. Of course, $N_{min}$ may be equal to $N_{max}$, $D_{min}$ may be equal to $D_{max}$, and/or $ER_n$ may be equal to $ER_x$.

Similar to operation 202, in an operation 502, the covariance matrix is received for the dataset to be processed. Similar to operation 204, in an operation 504, the eigen decomposition of the received covariance matrix is calculated as understood by a person of skill in the art. Similar to operation 206, in an operation 506, the first matrix is created.

In operation 509, N, D, and $ER_{min}$ are defined. For example, N may be initialized to $N_{min}$, D may be initialized to $D_{min}$, and $ER_{min}$ may be initialized to $ER_n$. Of course, N may be initialized to $N_{max}$, D may be initialized to $D_{max}$, and/or $ER_{min}$ may be initialized to $ER_x$. On successive iterations of operation 509, N, D, and $ER_{min}$ are redefined by incrementing up or down using $N_{inc}$, $D_{inc}$, and $ER_{inc}$ depending on the initial value as understood by a person of skill in the art.

Similar to operation 210, in an operation 510, a score is determined for each parameter of the plurality of parameters using the created first matrix and the current values of D and $ER_{min}$. Similar to operation 212, in an operation 512, the parameter set is identified based on the score and the current value of N.

Similar to operation 414, in an operation 514, a value of the space dilation is determined using the identified parameter set. In an illustrative embodiment, the value of the space dilation may be determined using a D-optimality output metric. Similar to operation 416, in an operation 516, the value of the determined space dilation is stored in association with the parameter set as understood by a person of skill in the art. For illustration, an indicator of the identified parameter set may be stored in a table with the iteration values for N, D, and $ER_{min}$ and with the D-optimality metric for each repetition of operation 516.

Similar to operation 418, in operation 518, the determination is made concerning whether or not another score is to be calculated. If another score is to be calculated, processing continues in operation 509 to update the value of N, D, or $ER_{min}$. Operations 510 to 516 are repeated for each incremental value of N between $N_{min}$ and $N_{max}$, for each incremental value of D between $D_{min}$ and $D_{max}$, and for each incremental value of $ER_{min}$ between $ER_n$ and $ER_x$. If each value of N, each value of D, and each value of $ER_{min}$ has been processed such that no additional score calculation is needed, processing continues in an operation 520.

Similar to operation 420, in operation 520, the final parameter set is selected based on the stored values of the measured space dilation. Similar to operation 422, in an operation 522, the selected final parameter set is output.

Parameter selection application 124 considers both the proportional eigenvalue relevance to variance and the eigenvector coefficients in selecting parameters representative of the dataset. Furthermore, parameter selection application 124 provides a systematic and repeatable process while considering more, if not all, of the component weights to evaluate the contribution of a parameter. This reduces the risk of ignoring parameters that are critically important to components, but are associated with smaller eigenvalues, and the risk of ignoring parameters that are moderately important to many components.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, the use of "and" or "or" is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated. It is intended that the scope of the disclosed subject matter be defined by the claims appended hereto and their equivalents.

What is claimed is:

1. A non-transitory computer-readable medium having stored thereon computer-readable instructions that when executed by a computing device cause the computing device to:
   receive a covariance matrix computed from a matrix of data that includes a plurality of data values for each of a plurality of parameters on which to perform cluster analysis;
   determine a total number of the plurality of parameters;
   receive a selection value for a number of parameters of the plurality of parameters to select, wherein the selection value is less than half of the determined total number of the plurality of parameters;
   compute an eigen decomposition of the received covariance matrix to form a decomposed matrix and an eigenvalue vector, wherein the decomposed matrix includes a number of eigenvectors equal to the determined total number of the plurality of parameters with each eigenvector of the eigenvectors including a coefficient for each parameter of the plurality of parameters, wherein the eigenvalue vector includes an eigenvalue defined for each eigenvector of the eigenvectors;
   create a first matrix by rank ordering the coefficient within each parameter of the plurality of parameters for each of the plurality of parameters;
   determine a score for each parameter of the plurality of parameters using the created first matrix and the eigenvalue vector;
   select a parameter set from the plurality of parameters based on the determined score for each parameter of the plurality of parameters, wherein a second number of parameters of the selected parameter set is equal to the received selection value;
   store the selected parameter set; and
   segment the matrix of data into clusters using the stored, selected parameter set.

2. The non-transitory computer-readable medium of claim 1, wherein the selected parameter set optimally, statistically represents the matrix of data using the second number of parameters.

3. The non-transitory computer-readable medium of claim 1, wherein the computer-readable instructions further cause the computing device to identify a depth value, wherein the depth value comprises information to determine a number of the rank ordered coefficients of the created first matrix to include in the score determination.

4. The non-transitory computer-readable medium of claim 3, wherein the score for each parameter is determined as $S_i = \sum_{j=1}^{D} R_{ji} * \lambda / p$, where $S_i$ is the score for the $i^{th}$ parameter, D is the identified depth value, $R_{ji}$ is the created first matrix, $\lambda$ is the eigenvalue associated with the eigenvector from which $R_{ji}$ was selected for the $i^{th}$ parameter, and p is the determined total number of the plurality of parameters.

5. The non-transitory computer-readable medium of claim 1, wherein the computer-readable instructions further cause the computing device to identify a minimum depth value and a maximum depth value, wherein the score determination, the parameter set selection, and the storing are performed for each value of a depth value in between and inclusive of the minimum depth value and the maximum depth value, wherein the depth value comprises information to determine a number of the rank ordered coefficients of the created first matrix to include in the score determination.

6. The non-transitory computer-readable medium of claim 5, wherein a final parameter set is selected from the stored selected parameter set for each performance of the storing before using the selected parameter set based on a comparison between the scores determined for each value of the depth value, wherein the stored, selected parameter set used to segment the matrix of data is the selected final parameter set.

7. The non-transitory computer-readable medium of claim 5, wherein the computer-readable instructions further cause the computing device to determine a space dilation value that results for the matrix of data based on the parameter set selected for each value of the depth value, wherein a final parameter set is selected from the stored selected parameter set for each performance of the storing before using the selected parameter set based on the determined space dilation value, wherein the stored, selected parameter set used to segment the matrix of data is the selected final parameter set.

8. The non-transitory computer-readable medium of claim 5, wherein the computer-readable instructions further cause the computing device to receive a second selection value for the number of parameters of the plurality of parameters to select, wherein the received selection value is a minimum number of parameters and the received second selection value is a maximum number of parameters, wherein the parameter set selection and the storing are further performed for each value of the number of parameters in between and inclusive of the minimum number of parameters and the maximum number of parameters.

9. The non-transitory computer-readable medium of claim 8, wherein the computer-readable instructions further cause the computing device to determine a space dilation value that results for the matrix of data based on the parameter set selected for each value of the number of parameters and each value of the depth value, wherein a final parameter set is selected from the stored selected parameter set for each performance of the storing before using the selected parameter set based on the determined space dilation value, wherein the stored, selected parameter set used to segment the matrix of data is the selected final parameter set.

10. The non-transitory computer-readable medium of claim 1, wherein the computer-readable instructions further cause the computing device to receive a second selection value for the number of parameters of the plurality of parameters to select, wherein the received selection value is a minimum number of parameters and the received second selection value is a maximum number of parameters, wherein the parameter set selection and the storing are performed for each value of the number of parameters in between and inclusive of the minimum number of parameters and the maximum number of parameters.

11. The non-transitory computer-readable medium of claim 10, wherein the computer-readable instructions further cause the computing device to determine a space dilation value that results for the matrix of data based on the parameter set selected and stored for each value of the number of parameters, wherein a final parameter set is selected from the stored selected parameter set for each performance of the storing before using the selected parameter set based on the determined space dilation value, wherein the stored, selected parameter set used to segment the matrix of data is the selected final parameter set.

12. The non-transitory computer-readable medium of claim 1, wherein the computer-readable instructions further cause the computing device to:
create a second matrix by rank ordering the coefficients of each eigenvector, wherein the second matrix includes a rank order value of the coefficient within each eigenvector in each matrix position of the decomposed matrix, wherein the score is determined for each parameter of the plurality of parameters using the created second matrix.

13. The non-transitory computer-readable medium of claim 12, wherein the computer-readable instructions further cause the computing device to:
identify an eigen depth value, wherein the eigen depth value includes information to determine a number of the rank ordered coefficients of each eigenvector to include in the score determination; and
to identify a depth value, wherein the depth value includes information to determine a number of the rank ordered coefficients of the created first matrix to include in the score determination.

14. The non-transitory computer-readable medium of claim 13, wherein the computer-readable instructions further cause the computing device to identify an eigen minimum value, wherein the score for each parameter is determined as $$S_i = \sum_{j=1}^{D} [\text{IF } ER_{ji} \leq ER_{min}] R_{ji} * \frac{\lambda}{p},$$

where $ER_{ji}$ is the created second matrix, $ER_{min}$ is the eigen minimum value, $S_i$ is the score for the $i^{th}$ parameter, D is the identified depth value, $R_{ji}$ is the created first matrix, $\lambda$ is the eigenvalue associated with the eigenvector from which $R_{ji}$ was selected for the $i^{th}$ parameter, and p is the determined total number of the plurality of parameters.

15. The non-transitory computer-readable medium of claim 13, wherein the computer-readable instructions further cause the computing device to identify a minimum eigen depth value and a maximum eigen depth value, wherein the score determination, the parameter set selection, and the storing are performed for each value of the eigen depth value in between and inclusive of the minimum eigen depth value and the maximum eigen depth value.

16. The non-transitory computer-readable medium of claim 15, wherein the computer-readable instructions further cause the computing device to determine a space dilation value that results for the matrix of data based on the parameter set selected for each value of the eigen depth value, wherein a final parameter set is selected from the stored selected parameter set for each performance of the storing before using the selected parameter set based on the determined space dilation value, wherein the stored, selected parameter set used to segment the matrix of data is the selected final parameter set.

17. The non-transitory computer-readable medium of claim 15, wherein the computer-readable instructions further cause the computing device to receive a second selection value for the number of parameters of the plurality of parameters to select, wherein the received selection value is a minimum number of parameters and the received second selection value is a maximum number of parameters, wherein the parameter set selection and the storing are further performed for each value of the number of parameters in between and inclusive of the minimum number of parameters and the maximum number of parameters.

18. The non-transitory computer-readable medium of claim 17, wherein the computer-readable instructions further cause the computing device to determine a space dilation value that results for the matrix of data based on the parameter set selected and stored for each value of the number of parameters and each value of the eigen depth value, wherein a final parameter set is selected from the stored selected parameter set for each performance of the storing before using the selected parameter set based on the determined space dilation value, wherein the stored, selected parameter set used to segment the matrix of data is the selected final parameter set.

19. The non-transitory computer-readable medium of claim 17, wherein the computer-readable instructions further cause the computing device to identify a minimum depth value and a maximum depth value, wherein the score determination, the parameter set selection, and the storing is performed for each value of the depth value in between and inclusive of the minimum depth value and the maximum depth value.

20. The non-transitory computer-readable medium of claim 19, wherein the computer-readable instructions further cause the computing device to determine a space dilation value that results for the matrix of data based on the parameter set selected and stored for each value of the number of parameters, for each value of the eigen depth value, and for each value of the depth value; and to select a final parameter set from the stored selected parameter set for each performance of the storing before using the selected parameter set based on the determined space dilation value, wherein the stored, selected parameter set used to segment the matrix of data is the selected final parameter set.

21. The non-transitory computer-readable medium of claim 15, wherein the computer-readable instructions further cause the computing device to identify a minimum depth value and a maximum depth value, wherein the score determination, the parameter set selection, and the storing is performed for each value of the depth value in between and inclusive of the minimum depth value and the maximum depth value.

22. The non-transitory computer-readable medium of claim 21, wherein the computer-readable instructions further cause the computing device to determine a space dilation value that results for the matrix of data based on the parameter set selected and stored for each value of the eigen depth value and each value of the depth value, wherein a final parameter set is selected from the stored selected parameter set for each performance of the storing before using the selected parameter set based on the determined space dilation value, wherein the stored, selected parameter set used to segment the matrix of data is the selected final parameter set.

23. The non-transitory computer-readable medium of claim 22, wherein the determined space dilation value is a D-optimality output metric.

24. The non-transitory computer-readable medium of claim 1, wherein the first matrix includes an absolute value of the coefficient in each matrix position of the decomposed matrix.

25. A system comprising:
a processor; and
a non-transitory computer-readable medium operably coupled to the processor, the computer-readable medium having computer-readable instructions stored thereon that, when executed by the processor, cause the system to
receive a covariance matrix computed from a matrix of data that includes a plurality of data values for each of a plurality of parameters on which to perform cluster analysis;
determine a total number of the plurality of parameters;
receive a selection value for a number of parameters of the plurality of parameters to select, wherein the selection value is less than half of the determined total number of the plurality of parameters;
compute an eigen decomposition of the received covariance matrix to form a decomposed matrix and an eigenvalue vector, wherein the decomposed matrix includes a number of eigenvectors equal to the determined number of the plurality of parameters with each eigenvector of the eigenvectors including a coefficient for each parameter of the plurality of parameters, wherein the eigenvalue vector includes an eigenvalue defined for each eigenvector of the eigenvectors;
create a first matrix by rank ordering the coefficient within each parameter of the plurality of parameters for each of the plurality of parameters;
determine a score for each parameter of the plurality of parameters using the created first matrix and the eigenvalue vector;
select a parameter set from the plurality of parameters based on the determined score for each parameter of the plurality of parameters, wherein a second number of parameters of the selected parameter set is equal to the received selection value;
store the selected parameter set; and
segment the matrix of data into clusters using the stored, selected parameter set.

26. A method of selecting a set of parameters representative of a data set, the method comprising:
receiving, by a computing device, a covariance matrix computed from a matrix of data that includes a plurality of data values for each of a plurality of parameters on which to perform cluster analysis;
determining, by the computing device, a total number of the plurality of parameters;
receiving, by the computing device, a selection value for a number of parameters of the plurality of parameters to select, wherein the selection value is less than half of the determined total number of the plurality of parameters;
computing, by the computing device, an eigen decomposition of the received covariance matrix to form a decomposed matrix and an eigenvalue vector, wherein the decomposed matrix includes a number of eigenvectors equal to the determined number of the plurality of parameters with each eigenvector of the eigenvectors including a coefficient for each parameter of the plurality of parameters, wherein the eigenvalue vector includes an eigenvalue defined for each eigenvector of the eigenvectors;
creating, by the computing device, a first matrix by rank ordering the coefficient within each parameter of the plurality of parameters for each of the plurality of parameters;
determining, by the computing device, a score for each parameter of the plurality of parameters using the created first matrix and the eigenvalue vector;
selecting, by the computing device, a parameter set from the plurality of parameters based on the determined score for each parameter of the plurality of parameters, wherein a second number of parameters of the selected parameter set is equal to the received selection value;

storing, by the computing device, the selected parameter set; and segmenting, by the computing device, the matrix of data into clusters using the stored, selected parameter set.

27. The method of claim 26, further comprising receiving a second selection value for the number of parameters of the plurality of parameters to select, wherein the received selection value is a minimum number of parameters and the received second selection value is a maximum number of parameters, wherein the parameter set selection and the storing are performed for each value of the number of parameters in between and inclusive of the minimum number of parameters and the maximum number of parameters.

28. The method of claim 27, further comprising determining a space dilation value that results for the matrix of data based on the parameter set selected and stored for each value of the number of parameters, wherein, before using the selected parameter set, a final parameter set is selected from the parameter set stored for each performance of the storing based on the determined space dilation value, wherein the stored, selected parameter set used to segment the matrix of data is the selected final parameter set.

29. The method of claim 26, further comprising identifying a minimum depth value and a maximum depth value, wherein the score determination, the parameter set selection, and the storing are performed for each value of a depth value in between and inclusive of the minimum depth value and the maximum depth value, wherein the depth value comprises information to determine a number of the rank ordered coefficients of the created first matrix to include in the score determination.

30. The method of claim 29, wherein, before using the selected parameter set, a final parameter set is selected from the parameter set stored for each performance of the storing based on a comparison between the scores determined for each value of the depth value, wherein the stored, selected parameter set used to segment the matrix of data is the selected final parameter set.

* * * * *